United States Patent Office 3,394,014
Patented July 23, 1968

3,394,014
PRODUCTION OF LIQUID SHORTENING
Raymond O. Simmons, La Habra, Edward J. Reid, Brea, and Alfred E. Blankenship and Perry W. Morgan, Jr., Fullerton, Calif., assignors to Hunt Foods and Industries, Inc., Fullerton, Calif., a corporation of Delaware
No Drawing. Continuation-in-part of application Ser. No. 381,557, July 9, 1964. This application Nov. 23, 1964, Ser. No. 413,344
14 Claims. (Cl. 99—118)

ABSTRACT OF THE DISCLOSURE

A liquid shortening is produced by hydrogenating a vegetable oil to an IV of 70–100, then cooling under controlled agitation to produce large-sized crystals, and separating the crystals.

---

The instant patent application is a continuation-in-part of our earlier application Ser. No. 381,557, filed July 9, 1964, and now abandoned, and entitled Liquid Shortening and Method of making same. This invention relates to the production of liquid shortenings which are especially adapted for use as pourable, frying or baking shortenings.

Shortenings produced for deep fat frying have been marketed by the shortening industry for many years. Initially these shortenings were a white, plastic, semi-solid mixture of a hard fatty component and a soft fatty component. During the manufacture of the foregoing product gas was commonly occluded to improve the workability of the shortening at ambient room temperatures and to produce a uniform white color. Before use, these products, being solid, required melting and because of their normal physical state were not possible to transfer by pumping. In the mid-1950's or thereabout, pourable liquid shortenings were first marketed. The early products were solid suspensions of hydrogenated oils in liquid or in partially-hydrogenated liquids. The latter products have not been wholly acceptable to the housewife. However, the suspension-type product, because of its liquid nature, has advantages in the commercial trade primarily because it may be readily transferred by pumping. The suspension-type shortenings are characterized by a high linoleic acid content which limits or impairs the frying stability of the shortening and on prolonged storage there is a tendency for the suspended solids of such liquid products to settle out.

It is a principal object of the invention to provide an improved liquid shortening having an exceptionally low temperature fluidity and a process for its manufacture.

It is a still further object of the invention to provide an improved process for the manufacture of a liquid shortening characterized by generally improved low temperature properties.

It is another object of the invention to provide a fluid shortening for home or commercial use which is wholly liquid, containing no solid dispersion, and a method of manufacture of the product.

It is a still further object of the invention to provide a process for the manufacture of a liquid shortening characterized by substantially no solid formation upon prolonged storage at temperatures of approximately 60° F. (15.6° C.).

The method of the invention for producing the improved liquid shortening comprises initially selectively hydrogenating a vegetable oil characterized by a fatty acid composition having at least 45% linoleic acid at a temperature in the range of 100–250° C. to produce a partially hydrogenated material having an iodine value within the range of 70–100 and more often in the range of 80–90. Thereafter, the partially hydrogenated material is cooled from an elevated temperature to a fractionation temperature within the general range of 5–25° C., preferably in the range of 13–17° C., with the cooling being carried on under conditions to obtain large-sized crystals which may be separated from the liquid component. Thereafter, the crystals are separated at the low fractionation temperature from the hydrogenated material to recover a liquid shortening product.

Certain vegetable oils such as soybean oil, cottonseed oil, safflower oil, and corn oil have been found to have fortuitous fatty acid makeups which permit the manufacture of a superior liquid shortening by the hydrogenating and crystal fractionating steps of the process of the invention. The vegetable oils suitable for use in the process of the invention have a fatty acid composition of at least 45% linoleic acid which is selectively hydrogenated principally to oleic acid. Preferably, the selective hydrogenation is carried on at a temperature within the more limited range of 160–185° C., which range of temperatures favors an increase in the trans isomer content of the fatty acids. The trans isomer form of the fatty acids is considerably more stable than the cis form at deep fat frying temperatures commonly used in large scale commercial establishments.

With proper selective hydrogenation, the polyunsaturated fatty acids of the soybean oil may be hydrogenated with a minimum of hydrogenation of oleic acid, a monosaturated material. Oleic acid is a particularly desirable constituent of the fluid shortening and hence it is the aim of the selective hydrogenation step of the process of the invention to hydrogenate the polyunsaturated acids, i.e., linoleic and linolenic acids without substantial hydrogenation of oleic acid occurring. Soybean oil, as an example, has a linoleic acid content of approximately 53% and linolenic acid content of roughly 7%. The selective hydrogenation step of the process of the invention is carried on to reduce the linoleic acid content to less than 15% and preferably about 8% or somewhat less. The linolenic acid content is desirably reduced to substantially zero. Linolenic acid is responsible for the characteristic odor of soybean oil and it is very important that it be substantially removed from the fluid shortening product. It has been established that linoleic acid, which contains two double bonds, if present in the fluid shortening in too large an amount, causes the shortening to oxidize too readily and generally adversely affects the stability of the oil, this being especially true under the conditions of commercial deep frying.

Cottonseed oil which may also be used in the process of the invention has typically a fatty acid composition containing 51.5% linoleic acid; corn oil 55% linoleic acid; and safflower oil 75% linoleic acid.

Nickel or other suitable catalysts are used in the hydrogenation of the vegetable oil with the hydrogenation being carried on to impart to the material an iodine value within the broad range of 70–100 and preferably within the more limited range of 80 or 83 to 85. An oil hydrogenated to an iodine value of 75 will have an oil component of approximately 25% in the preferred crystal fractionation range.

The separation of the liquid and solid fractions from the cooled partially hydrogenated material has proven to be a critical factor in the production of the liquid shortening of the invention. Too rapid cooling of the hydrogenated material from its elevated temperature above its crystal fractionation range to the fractionation temperature in the range of 5–25° C. results in the formation of very small crystals which have proven difficult, if not impossible, to separate. The use of a scraper-surface chiller of the Votator or Emulsorator type provides objectionable fast cooling leading to small crystal formation and it is best that the devices of this type be avoided. However, a scraper-surface device may be used to quick chill the hydrogenated stock to a temperature above its crystal fractionation range without adverse effects with the rest of the chilling being carried on slowly and with agitation to the crystallization temperature. Such an arrangement will shorten the time of the production cycle.

Cooling of the hydrogenated material from its initial elevated temperature should be carried on slowly and with suitable agitation to the desired crystallization temperature. It has been mentioned that rapid chilling and agitation, such as that provided by a Votator, results in fine crystals which cannot be readily separated from the liquid portion. Similarly, cooling without agitation results in a solid mass characterized by excessively large crystals and no visible or poor crystal-liquid break. Air agitation, while it may be used, results in generally inferior products. Particularly satisfactory agitation may be had with a "gate type" impeller. With this means of agitation the crystals are discrete and large. The cooling is best carried on over a period of 1 to 16 hours and conditions should be such as to provide a phase having at least about 75% of the crystals 50 microns or larger in their smallest dimension and preferably within the range of 100 to 300 microns. Desirably, no more than 5% of the crystals should be over 1000 microns in maximum dimension and preferably no more than 10% of the crystals should be over 500 microns in size. The crystals may be separated from the oil by a filter press, basket centrifuge, or other devices. The term "crystals" is used herein to define single crystals and clusters of crystals.

The following is a report of one series of comparative experiments carried on to determine the effective agitation and cooling rate on crystal size in the fractionation of hydrogenated soybean oil. The starting stock used in each of the following experiments was a soybean oil hydrogenated at 180° C. to an iodine value (IV) of 85. Three methods of fractionation were employed as described in the examples below. Filtering where indicated in the following examples was accomplished by the following technique. A Büchner funnel with cotton duck filter cloth was used with a suction flask. A vacuum pump created a reduced pressure in the flask which was the driving force for pulling the liquid into the flask. The partial pressure was increased in stepwise increments from 5" to 28" of vacuum. Each reduced pressure was maintained until the liquid filtrage flow became dropwise.

Example 1

Fifteen hundred grams of the foregoing 85 IV soybean oil were heated to 60° C., placed in a glass jar, and stored in a 15.6° C. oven for approximately 100 hours. The stock required between 8 and 16 hours to reach 15.6° C. The consistency of the liquid-crystal mixture was very stiff, with poor liquid-crystal break (discreteness of crystals), and was nonpourable.

Example 2

In this example, two thousand grams of the same hydrogenated soybean oil were heated to 60° C., suspended in a temperature-controlled bath, and agitated with a large perforated paddle at 24 r.p.m. The bath temperature was 14.4–15° C. Three hours were required for the stock to reach the fractionation temperature of 15.6° C. The mixture was held with agitation at 15.6° C. for one hour. The liquid-crystal mixture was completely fluid, and exhibited a good break; that is, the crystals were well defined and uniformly suspended in the liquid and were readily separated in subsequent filtering.

Example 3

Two thousand grams of the same 85 IV soybean oil were melted and pumped through a scraped surface heat exchanger of the Emulsorator type. The stock was chilled to a temperature of 13.3° C. in less than three minutes. The quick chilling produced a small crystal formation which in a short time completely solidified.

Photomicrographs were taken of the materials produced in the three foregoing examples. It was shown that without agitation the crystals grow to a very large size having long thin tenacles extending from the crystals which likely are responsible for trapping and holding liquid oil. It is likely that the rate of cooling of Example 1 also significantly affected the crystal size because, with no agitation, the cooling rate was the slowest, which would also induce increased crystal size.

The photomicrographs of the liquid-crystal mixture obtained by the quick chilling in the scraped-surface heat exchanger of Example 3 show the crystal size to be exceedingly small. Again, it appears that the crystal size is a function of agitation and rate of cooling and both of these parameters were high in this case. The scraped surface chiller had an agitator speed of 600 r.p.m. With the presence of the many small crystals, a latticework was formed which prevented separation of the liquid and crystals.

In the method of Example 2 the photomicrographs showed fairly large crystals or clusters of crystals with relatively short tentacles and the amount of liquid entrapped or held by the crystals was low. The desired agitation for best performance of the process of the invention was obtained with gate paddle impellers or turbine-type agitators at low speeds. The range of speeds found useful varied from approximately 10 r.p.m. to 200 r.p.m. The preferred rate of cooling lies in the range of 5° F./hour to 50° F./hour.

There is set forth in Table I the results of fractionation studies carried on under varying fractionation conditions with differing soybean starting stocks. It will be seen that the hydrogenation temperature has a significant effect upon the percent of the desired trans isomer formed. The fractionation conditions employed have a definite bearing on the size of the oil fraction recovered.

TABLE I

| Fractionation Condition | | | Starting Stock | | | | | Oil Portion | | | |
|---|---|---|---|---|---|---|---|---|---|---|---|
| Temp., ° F. | Agitator, R.P.M. | Hours at Temp. | Hydrogenation, Temp. | IV[1] | Solids at (° F.) 50 | Solids at (° F.) 92 | Melt Point | IV[1] | Percent. Trans. | Solids at (° F.) 50 | Solids at (° F.) 70 | Percent, Yield |
| 60 | 40–45 | 2 | 120–130 | 82.6 | 20.0 | 0.5 | 30.9 | 89.1 | 31.8 | 0.2 | ------ | 58.3 |
| 60 | 24 | 1 | 120–130 | 82.6 | 20.0 | 0.5 | 30.9 | 90.3 | 28.8 | 0.1 | ------ | 50.8 |
| 65 | 24 | 1 | 120–130 | 82.6 | 20.0 | 0.5 | 30.9 | 88.5 | 33.1 | 13.0 | 0.7 | 70.0 |
| 60 | 40 | 1.5 | 160–185 | 80.8 | 29.8 | 0 | 29.7 | 85.4 | 35.5 | 8.1 | 0.2 | 50.4 |
| 60 | 24 | 1 | 160–185 | 80.8 | 29.8 | 0 | 29.7 | 85.3 | 37.0 | 4.7 | 0 | 47.8 |
| 60 | 24 | 2 | 160–185 | 80.8 | 29.8 | 0 | 29.7 | 85.7 | 36.9 | 1.5 | 0.4 | 49.0 |
| 60 | 24 | 4 | 160–185 | 80.8 | 29.8 | 0 | 29.7 | 85.7 | 37.3 | 0.7 | 0.2 | 48.3 |
| 65 | 24 | 1 | 160–185 | 80.8 | 29.8 | 0 | 29.7 | 84.4 | 38.0 | 16.5 | 0.2 | 54.6 |
| 55 | 24 | 1 | 160–185 | 80.8 | 29.8 | 0 | 29.7 | 85.9 | 36.6 | 0.2 | 0.1 | 39.0 |
| 60 | 24 | 1 | 160–185 | 83.9 | 25.4 | 0 | 29.8 | 88.4 | 35.3 | 0.1 | ------ | 54.0 |
| 55 | 24 | 1 | 160–185 | 83.9 | 25.4 | 0 | 29.8 | 89.3 | 35.3 | 0 | ------ | 47.3 |
| 65 | 24 | 1 | 160–185 | 75.2 | 45.9 | 3.4 | 35.6 | 81.9 | 46.2 | 29.9 | 0.6 | 32.4 |
| 60 | 24 | 1 | 160–185 | 75.2 | 45.9 | 3.4 | 35.6 | 81.4 | 47.5 | 31.6 | 4.0 | 25.8 |
| 60 | 12 | 1 | 160–185 | 81.1 | 30.5 | 0.2 | 30.2 | 85.7 | 39.4 | 7.1 | ------ | 49.3 |
| 60 | 24 | 1 | 160–185 | 81.1 | 30.5 | 0.2 | 30.2 | 86.0 | 38.0 | 4.2 | 0.3 | 49.6 |
| 60 | 36 | 1 | 160–185 | 81.1 | 30.5 | 0.2 | 30.2 | 85.7 | 39.9 | 4.6 | ------ | 48.6 |
| 60 | 48 | 1 | 160–185 | 18.1 | 30.5 | 0.2 | 30.2 | 85.9 | 38.1 | 5.5 | 0.2 | 49.2 |
| 65 | 24 | 1 | 160–185 | 83.9 | 25.4 | 0 | 29.8 | 87.3 | 36.4 | 11.7 | ------ | 64.7 |

[1] Iodine value.

Example 4

This example demonstrates the relative yields obtainable with the processing of soybean, cottonseed, and safflower oils in accordance with the invention. Each of the three oils had two samples hydrogenated to the iodine values (I.V.) indicated in Table II. All hydrogenations were carried on at 180° C. with a nickel catalyst. The two soybean samples were hydrogenated respectively to iodine values of 80.8 and 83.9. The cottonseed samples were hydrogenated to iodine values of 82.6 and 84.8 and the safflower samples to iodine values respectively of 84.8 and 87.0. The samples of all three oils were processed in a like fashion with each hydrogenated stock being slowly cooled with agitation from 60° C. over a period of 3 hours to reach the fractionation temperature of 15.6° C. The cooled mixture was held with agitation at 15.6° C. for one hour prior to filtration accomplished as described above. The agitation was accomplished with a large perforated paddle at 24 r.p.m. All samples were completely fluid with the crystals being well defined and uniformly suspended in the liquid phase. There was no difference in filtration time or character of the separated solids. The crystals obtained were similar in microscopic appearance and size for the three different hydrogenated oils. The oil fraction percent yield for each of the samples is set forth in Table III where it is seen, for example, that the two soybean oil samples had percent oil fraction yields of 48.3 and 54.0. The safflower oil exhibited percent oil fraction yields of 50.7 and 54.7. The two cottonseed samples had percent yields of 57.1 and 64.5. Table III provides other fractionation data on the several examples.

TABLE II.—ANALYTICAL DATA ON VEGETABLE OILS HYDROGENATED AT 180° C.

| Oil | Soybean | | Cottonseed | | Safflower | |
| --- | --- | --- | --- | --- | --- | --- |
| I.V. | 80.8 | 83.9 | 82.6 | 84.8 | 84.4 | 87.0 |
| Solids: | | | | | | |
| 10° C. | 29.8 | 25.4 | 21.5 | 16.3 | 31.1 | 28.3 |
| 21.1° C. | 14.0 | 11.1 | 10.7 | 7.8 | 13.6 | 11.0 |
| 26.7° C. | 6.8 | 4.9 | 7.0 | 5.0 | 6.8 | 3.8 |
| 33.3° C. | 0 | 0 | 0.8 | 0.4 | 0 | 0 |
| 40° C. | 0 | 0 | 0 | 0 | 0 | 0 |

TABLE III.—15.6 °C. FRACTIONATION DATA ON HYDROGENATED VEGETABLE OILS

| | Starting Stock, Iodine Value | Oil Fraction | | | Solid Fraction | | | | | |
| --- | --- | --- | --- | --- | --- | --- | --- | --- | --- | --- |
| | | Percent, Yield | IV | 10° C. Solids | IV | Percent Solids At | | | | |
| | | | | | | 10° C. | 21.1° C. | 26.7° C. | 33.3° C. | 40° C. |
| Stock Oil: | | | | | | | | | | |
| Soybean | 80.8 | 48.3 | 85.7 | 0.7 | 73.8 | 44.9 | 30.3 | 22.5 | 4.1 | 0 |
| | 83.9 | 54.0 | 88.4 | 0.1 | 76.9 | 41.9 | 28.0 | 20.8 | 3.4 | 0.3 |
| Cottonseed | 82.6 | 57.1 | 88.2 | 0.8 | 69.9 | 39.8 | 28.3 | 24.4 | 12.2 | 0.2 |
| | 84.8 | 64.5 | 92.0 | 0.3 | 73.0 | 35.3 | 25.1 | 21.8 | 11.3 | 0.4 |
| Safflower | 84.4 | 50.7 | 89.3 | 0.5 | 76.1 | 46.7 | 31.0 | 23.1 | 5.2 | 0.4 |
| | 87.0 | 54.7 | 91.7 | 0.8 | 79.0 | 44.6 | 28.5 | 19.6 | 2.1 | 0.3 |

Although exemplary embodiments of the invention have been disclosed herein for purposes of illustration, it will be understood that various changes, modifications, and substitutions may be incorporated in such embodiments without departing from the spirit of the invention as defined by the claims which follow.

We claim:
1. In a method of producing an improved liquid shortening, the steps comprising:
   (1) selectively hydrogenating a vegetable oil characterized by a fatty acid composition having at least 45% linoleic acid at a temperature in the range of 100–250° C. to produce a partially hydrogenated material having an iodine value in the range of 70–100;
   (2) cooling a quantity of the foregoing hydrogenated material from a liquid state to a temperature in the range of 5–25° C., said cooling being carried on with agitation to obtain large-sized, separable crystals; and
   (3) separating the crystals from the hydrogenated material to recover a liquid shortening product.
2. A method in accordance with claim 1 wherein the vegetable oil is soybean oil.
3. A method in accordance with claim 1 wherein the vegetable oil is cottonseed oil.
4. A method in accordance with claim 1 wherein the vegetable oil is safflower oil.
5. In a method of producing an improved liquid shortening, the steps comprising:
   (1) selectively hydrogenating a vegetable oil characterized by a fatty acid composition having at least 45% linoleic acid at a temperature in the range of 160–185° C. to produce a partially hydrogenated material having an iodine value within the range of 70–100 and characterized by an increase in trans isomer content of the fatty acids;
   (2) cooling the partially hydrogenated material from a liquid state to a temperature in the range of 5–25° C., said cooling being carried on with agitation to obtain large-sized, separable crystals; and
   (3) thereafter separating the crystals from the cooled partially hydrogenated material to recover an improved liquid shortening.
6. In a method of producing an improved liquid shortening, the steps comprising:
   (1) selectively hydrogenating a vegetable oil characterized by a fatty acid composition having at least 45% linoleic acid at a temperature in the range of 160–185° C. to produce a partially hydrogenated material having an iodine value in the range of 80–90, said hydrogenated material having a linoleic acid content of less than 15% and an increased trans fatty acid content;
   (2) cooling the foregoing partially hydrogenated material from a liquid state to a temperature in the range of 5–25° C., said cooling being carried on with agitation to obtain relatively large-sized, separable crystals; and
   (3) thereafter separating the liquid component from the crystals of the partially hydrogenated material to recover an improved liquid shortening.
7. A method in accordance with claim 6 wherein the vegetable oil is soybean oil.
8. A method in accordance with claim 6 wherein the vegetable oil is cottonseed oil.
9. A method in accordance with claim 6 wherein the vegetable oil is safflower oil.
10. In a method of producing an improved liquid shortening, the steps comprising:
   (1) selectively hydrogenating a vegetable oil characterized by a fatty acid composition having at least 45% linoleic acid at a temperature in the range of 160–185° C. to produce a partially hydrogenated material having an iodine value in the range of 80–85 and characterized by a linoleic acid content of less than 8% and being substantially free of linolenic acid, said partially hydrogenated material being further characterized by having a substantial increase in the percent of fatty acids having a trans form;
   (2) cooling the hydrogenated material from a liquid state to a temperature in the range of 13–17° C., said cooling being carried on with agitation to obtain large-sized separable crystals; and

(3) thereafter separating the liquid component from the crystals of the cooled partially hydrogenated material to recover a liquid shortening.

11. In a method of producing an improved liquid shortening, the steps comprising:
   (1) selectively hydrogenating a vegetable oil characterized by a fatty acid composition having at least 45% linoleic acid at a temperature in the range of 160–185° C. to produce a partially hydrogenated material having an iodine value in the range of 83–85 and characterized by a linoleic acid content of less than 8% and substantially no linolenic acid and further characterized by having a significant increase in the trans content of the fatty acids over that normally found in said oil;
   (2) slowly cooling the foregoing hydrogenated material with agitation from an elevated temperature to a temperature in the range of 13–17° C., said cooling being carried on to obtain a crystal phase having at least about 75% of the crystals with a minimum dimension of not less than 50 microns; and
   (3) thereafter separating the liquid component from the crystal phase to recover an improved liquid shortening.

12. A method as defined in claim 1 in which said agitation is a controlled mechanical agitation effected by moving rotating members at low speed through the hydrogenated material during the cooling thereof.

13. A method as defined in claim 1 in which the agitation is a controlled mechanical agitation effected by sweeping a gate-type impeller or turbine-type agitator through the hydrogenated material at a rate of about 10–200 r.p.m. during cooling of said hydrogenated material at a rate of about 5–50° F./hr.

14. In a method of producing an improved completely liquid shortening free of any dispersed solids at storage temperatures above approximately 60° F., the steps comprising:
   (1) selectively hydrogenating a vegetable oil characterized by a fatty acid composition having at least 45% linoleic acid at a temperature in the range of 160–185° C. to produce a partially hydrogenated material having an iodine value in the range of 80–85 and characterized by a significant increase in the trans isomer content of the fatty acid and further characterized by having a linoleic acid content of less than 8% and substantially no linolenic acid present; and
   (2) cooling with agitation the foregoing partially hydrogenated material from an elevated temperature above its crystal fractionation range to a temperature in the range of about 13–17° C. to obtain large sized, separable crystals, said cooling being continued for a period of about 1–16 hours at a rate of about 5–50° F./hr. during agitation that is continued throughout the cooling, said agitation being effected by sweeping rotating members through the batch of partially hydrogenated material at a rate of about 10–200 r.p.m.

References Cited

UNITED STATES PATENTS

| | | | |
|---|---|---|---|
| 1,187,999 | 6/1916 | Lowenstein | 99—118 |
| 1,483,155 | 2/1924 | Boyce | 99—118 |
| 2,351,832 | 6/1944 | Neal | 260—409 |
| 2,589,097 | 3/1952 | Lange et al. | 260—409 |
| 2,619,421 | 11/1952 | Greenfield | 99—118 |
| 2,874,055 | 2/1959 | Melnick et al. | 99—118 |
| 2,968,564 | 1/1961 | Schroeder et al. | 99—118 |

MAURICE W. GREENSTEIN, *Primary Examiner.*

UNITED STATES PATENT OFFICE
CERTIFICATE OF CORRECTION

Patent No. 3,394,014                                           July 23, 1968

Raymond O. Simmons et al.

It is certified that error appears in the above identified patent and that said Letters Patent are hereby corrected as shown below:

Columns 3 and 4, TABLE I, first column, line 2 thereof, "60" should read -- 55 --; same table, fourth column, line 1 thereof, after "120-130" insert -- ° C. --. Column 5, line 12, "84.8" should read -- 84.4 --.

Signed and sealed this 16th day of December 1969.

(SEAL)
Attest:

Edward M. Fletcher, Jr.                                WILLIAM E. SCHUYLER, JR.
Attesting Officer                                                  Commissioner of Patents